(No Model.)  2 Sheets—Sheet 1.
T. O'CONNELL.
GRIPPER FOR CABLE RAILWAYS.
No. 351,997.   Patented Nov. 2, 1886.
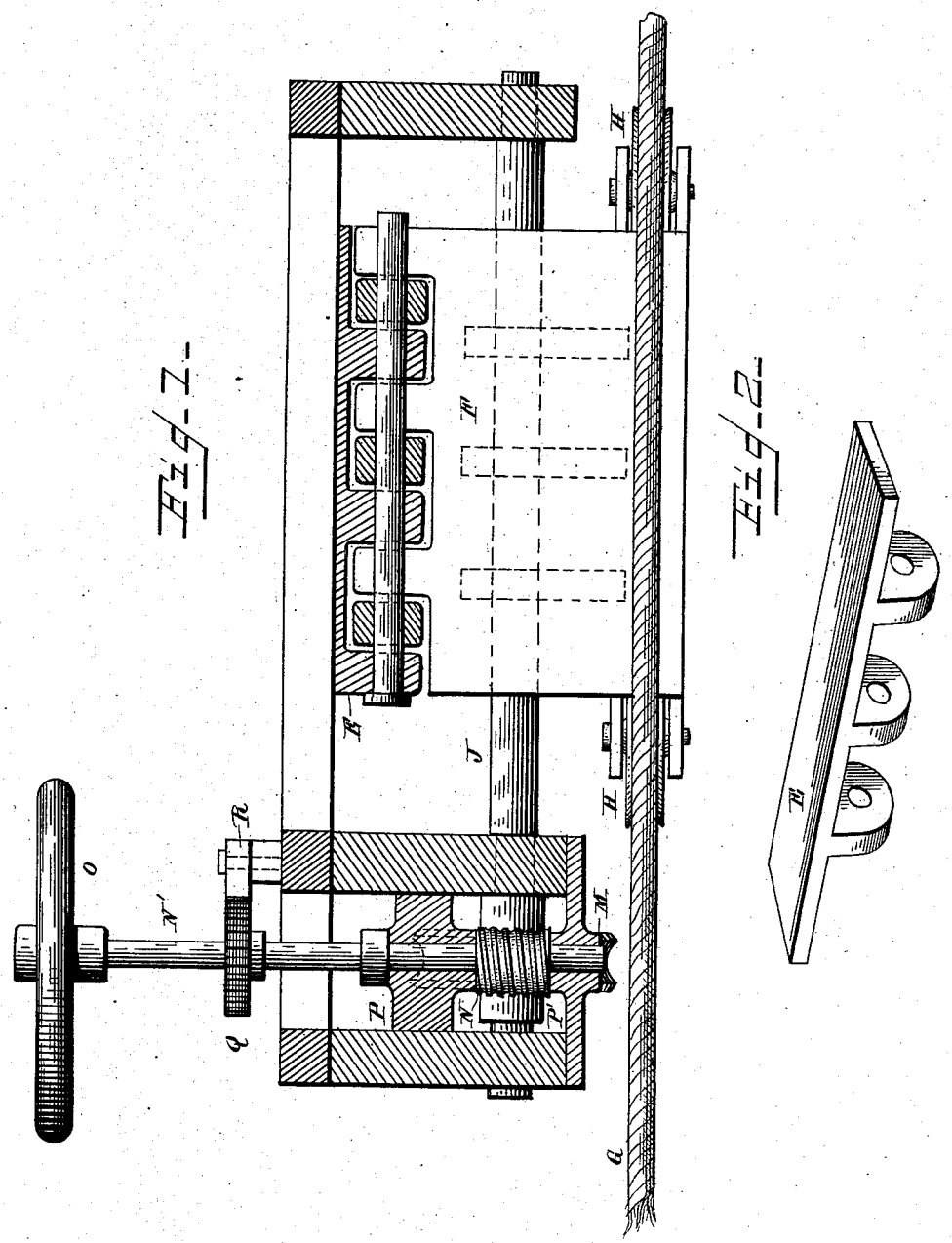
Witnesses
H. S. Rohrer
John Imrie
Thomas O'Connell
Inventor
By O. E. Duff
Attorney (No Model.) 2 Sheets—Sheet 2.
T. O'CONNELL.
GRIPPER FOR CABLE RAILWAYS.
No. 351,997. Patented Nov. 2, 1886.
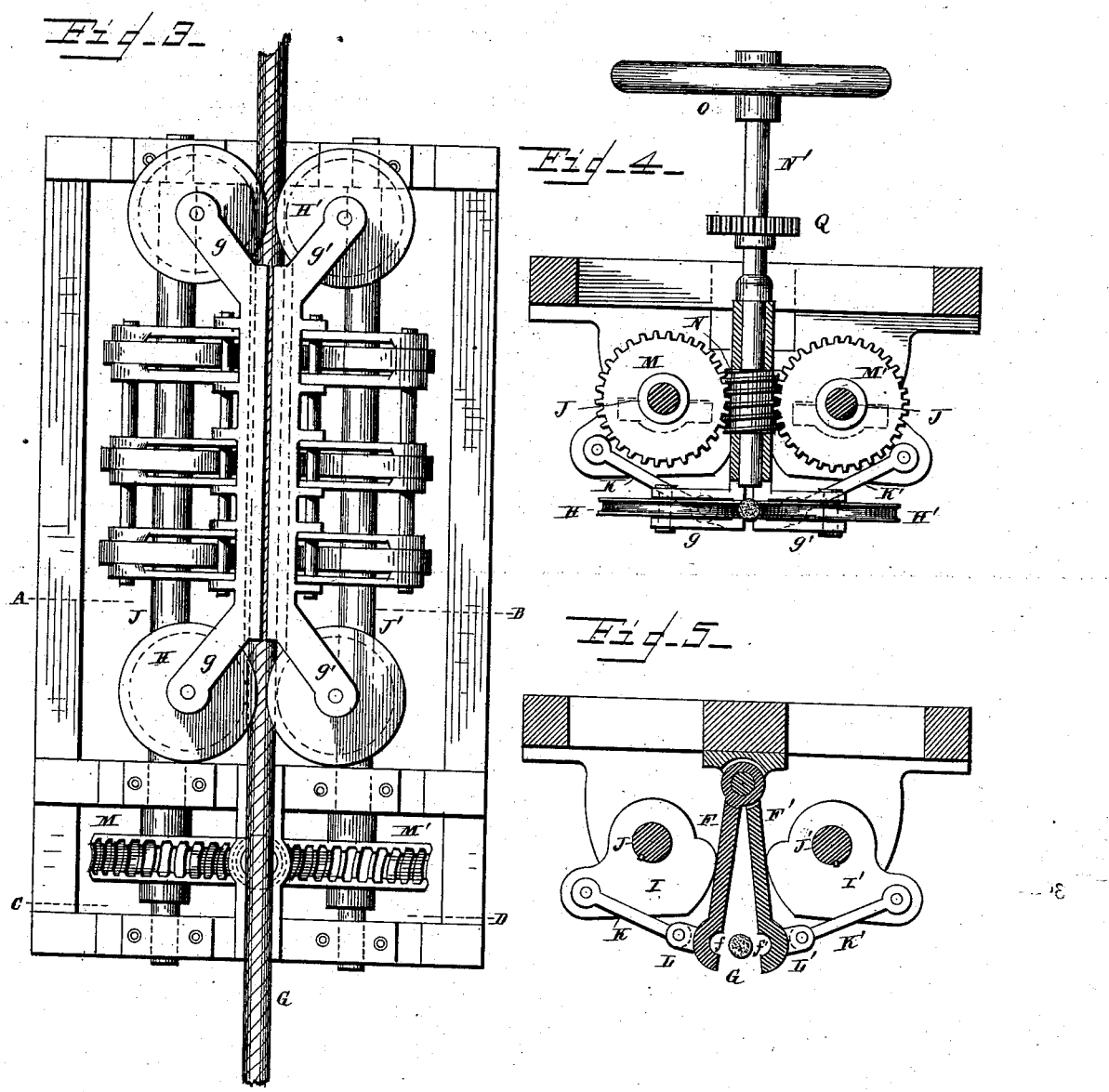

UNITED STATES PATENT OFFICE.

THOMAS O'CONNELL, OF BROOKLYN, NEW YORK.

GRIPPER FOR CABLE RAILWAYS.

SPECIFICATION forming part of Letters Patent No. 351,997, dated November 2, 1886.

Application filed March 6, 1886. Serial No. 194,306. (No model.)

*To all whom it may concern:*

Be it known that I, THOMAS O'CONNELL, of Brooklyn, in the county of Kings and State of New York, have invented certain new and useful Improvements in Grippers for Cable Railways; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention has relation to gripping devices such as are applied to the cars of cable railways or tramways for grasping the cable by means of which the car is drawn along.

The special object of the invention is to provide a gripping device that shall be effective and reliable in its action, and at the same time subject the cable to as little injury as possible from abrasion and other causes.

Most of the grippers now in use and proposed for use either fail to grasp the cable with sufficient firmness, and so are useless or unreliable for the purpose for which they were designed, or else they exert their force upon the cable in such a manner as to injure it. In some cases the cable is bent out of its course, or in still other ways subjected to unequal strain on different sides, and in other cases the cable is rendered liable to abrasion from the sharp edges of the grip. In either case the cable is gradually weakened and rendered unsafe or unfit for use. The question of safety on cable railways is very seriously involved in both the defects above mentioned, as fatal accidents have been caused both by the slipping of the grip and the breaking of the cable. To obviate these defects I provide means whereby the gripping-halves are applied with great force for a considerable distance along the cable, and whereby the cable is pressed evenly from opposite sides.

The particular construction in which I have embodied my invention is illustrated in the accompanying drawings, in which—

Figure 1 represents a vertical longitudinal section through my gripping device applied to the bottom of a car. Fig. 2 is a perspective view of a hinge-plate to which the gripping halves are to be hinged. Fig. 3 is a bottom view of gripping device, showing also the framing of a car to which it is secured. Fig. 4 is a section taken on line C D, Fig. 3; and Fig. 5 is a section taken on line A B, Fig. 3.

The gripping device proper is attached to a hinge-plate, E, which is bolted to one of the stringers on the bottom of a car or other vehicle. The grip consists of two similar plates, F F', and when hinged and pressed together these plates fit closely against each other on their inner surfaces. The plates are provided, just above their inner lower edges, with semicircular grooves $f f'$, which in the normal position of the plates F F' are located on opposite sides of the cable G, but at such a distance therefrom that the cable does not come in contact with the surface of the plates or grooves. For this purpose the plates are held somewhat apart, as shown in Fig. 5. When, however, the plates are in the closed position, the grooves $f f'$ form a circular opening too small for the cable to pass through without friction.

It is evident that the plates F F' may be as long as is deemed necessary or desirable, in order to secure a greater or less amount of surface for friction. The ends of the plates F F' are formed into double standards $g g'$, in which pulleys or friction-wheels H H' are pivoted. These wheels are also arranged on opposite sides of the cable G; but their bearing-surfaces are slightly advanced beyond the inner faces of the semicircular grooves, whereby it is effected that the initial steps in the process of gripping the cable are performed without the usual sudden jerk and strain. After the friction-wheels have come in contact with the cable, if the pressure is continued, the inner surfaces of the grooves $f f'$ will be brought against the cable and bear upon it throughout the entire length of the plates.

The direct means by which pressure is exerted upon the plates F F', in order to effect the necessary grip, consists of the cams I I', keyed to the shafts J J', together with the links K K' and the lugs L L'.

Referring to Fig. 5, it will be seen that pressure is exerted upon each plate, both by the cam and the link, when the shafts are turned in the proper direction. For example, if the shaft J' in Fig. 5 is turned to the right, it is evident that the cam I' will press against the plate F' near the middle thereof, while the link K', which is swiveled to a pin on the cam I' and to a lug, L', on the plate, will urge the lower portion of the plate toward the cable G. In practice, I locate a series of cams along the shafts J J', each cam being provided with similar link and lug connections. By this construction I relieve the plates themselves from unnecessary strain, the force which presses them against the cable being applied substantially along the whole outer surface of the plates.

The shafts J J' are supported in suitable bearings secured to the bottom of the car or vehicle, and are rotated to effect the operation of the cams and links by an ordinary worm-gear consisting of the gear-wheels M M', the worm N, the worm-shaft N', and the hand-wheel O. The worm-shaft is supported in suitable bearings, P P', as shown in Fig. 1. The hand-wheel is located within the car or above the platform thereof in a position to be grasped by a brakeman or other railway official. On the shaft N', likewise above the floor or platform of the car, is fixed the usual ratchet-wheel, Q. The ratchet-wheel is engaged by a dog or detent, R, which will hold the ratchet and the mechanism connected therewith until removed from engagement with the ratchet by the brakeman or other official. Besides the function already ascribed to the links K K', they serve also to draw the plates F F' away from the cable and hold them away when the grip is removed from actual use.

Having now described my invention, what I claim, and desire to secure by Letters Patent, is—

1. In a gripping device for cable railways, the combination, with hinged gripping-plates, of means, substantially such as described, for exerting pressure thereon both centrally and at the outer free ends.

2. In a gripping device for cable railways, a pair of operating-shafts, each provided with one or more cams having a link or links attached thereto, in combination with gripping-plates provided with lugs for the attachment of the links, substantially as and for the purpose set forth.

3. In a gripping device for cable railways, the combination, with the shafts J J' and suitable worm-gear for operating the same, of the cams I I', links K K', lugs L L', and plates F F', the latter being provided with semicircular grooves $f\ f'$, substantially as and for the purpose set forth.

In testimony that I claim the foregoing as my my own I affix my signature in presence of two witnesses.

THOMAS O'CONNELL.

Witnesses:
  O. E. DUFFY,
  GEO. M. LOCKWOOD.